United States Patent [19]

Radici et al.

[11] 4,000,215
[45] Dec. 28, 1976

[54] PROCESS FOR THE PREPARATION AND THE SIMULTANEOUS STABILIZATION OF POLYOXYMETHYLENE

[75] Inventors: Pierino Radici, Turate (Como); Paolo Colombo, Saronno (Varese); Roberto Croce, Erba (Como), all of Italy

[73] Assignee: Societa' Italiana Resine S.I.R. S.p.A., Milan, Italy

[22] Filed: Dec. 9, 1975

[21] Appl. No.: 639,139

[30] Foreign Application Priority Data
Dec. 20, 1974 Italy .................. 30813/74

[52] U.S. Cl. .............. 260/857 F; 260/33.2 R; 260/33.6 R; 260/33.8 R; 260/45.85; 260/45.9 P
[51] Int. Cl.² .......................................... C08L 77/00
[58] Field of Search ............................ 260/857 F

[56] References Cited
UNITED STATES PATENTS

| | | | |
|---|---|---|---|
| 2,993,025 | 7/1961 | Alsup | 260/857 F |
| 3,204,012 | 8/1965 | Eguchi | 260/857 F |
| 3,235,624 | 2/1966 | Green | 260/857 F |
| 3,288,885 | 11/1966 | Green | 260/857 F |

*Primary Examiner*—Paul Lieberman
*Attorney, Agent, or Firm*—Sughrue, Rothwell, Mion, Zinn & Macpeak

[57] ABSTRACT

Polyoxymethylene is obtained in a stabilized form by polymerizing formaldehyde in a liquid organic diluent containing in a dispersed form a catalyst-stabilizer consisting of a polylactamic polymer carrying a terminal ionic couple on its macromolecular chain, said catalyst-stabilizer being present in an amount of from 0.1 to 5 parts by weight for each 100 parts of polyoxymethylene.

10 Claims, No Drawings

PROCESS FOR THE PREPARATION AND THE SIMULTANEOUS STABILIZATION OF POLYOXYMETHYLENE

The present invention concerns a process for the polymerization of formaldehyde and for the simultaneous stabilization of the polyoxymethylene originated from said polymerization.

Polymers of formaldehyde (or polyoxymethylenes) with a molecular weight equal to at least 10,000, endowed with mechanical characteristics such as tenacity, exceptional dimensional stability, hardness, resilience and dielectric properties, such as to make them useful as plastic materials for special applications, are known in the art.

The polyoxymethylenes obtained from formaldehyde are generally prepared by introducing the gaseous and anhydrous monomer in an organic, inert (non-reactive) liquid, carrying out the operation in the presence of a catalyst.

The catalysts useful for this purpose are of various natures, such as, for instance, amino compounds, hydrazines, arsines, stibines and phosphines, alkali metal salts of organic acids, boron and aluminum halides.

The polyoxymethylene thus obtained, contains for each macromolecule at least one terminal hydroxyl group which renders the polymer thermically unstable and therefore said polyoxymethylene is treated for the purpose of transforming said hydroxyl groups into others endowed with greater stability.

Therefore, transformations into ester or ether groups, for example by reaction with acetic anhydride or, respectively, with ethyl or methyl orthoformate, or in urethan groups by reaction with isocyanates, are known.

As known, notwithstanding the transformation of the terminal groups, the acetal polymers are practically unusable as plastic material, on account of the strong sensitivity towards oxygen, heat, ultraviolet radiations and the traces of impurities always contained in a technical product.

Consequently, decomposition of the polyoxymethylene, occurs, especially at elevated temperature, for instance, during the extrusion- and molding treatments in a molten state.

To obviate these undesired phenomena, the use of antioxidants, in general phenolic ones (substituted phenols or substituted bisphenols) which are incorporated into the formaldehyde polymer, is expedient in the art.

Since there is still development of products derived from the degradation of the macromolecular chain, notwithstanding this stabilization with antioxidants, substances capable of blocking the formaldehyde and its oxidation products (for example formic acid) are incorporated into the polyoxymethylene.

Said blocking substances are fundamentally basic in nature, of a rather high molecular weight and are normally chosen among various types of polyamides.

The problems arising in the polymerization of formaldehyde and in the stabilization of the resulting polyoxymethylene are of various natures.

Thus, for instance, the catalysts known so far yield polyoxymethylenes with a certain degree of dispersion of the molecular weight.

Besides, said catalysts must be thoroughly removed from the polymer because their presence promotes the polymer decomposition especially during that treatment in the molten state to which reference has been previously made. Furthermore there are problems in the stabilization of the polyoxymethylene, in particular during the addition of those basic polymeric substances capable of blocking the formaldehyde and its oxidation products.

As is known the addition of polyamide (or of compounds having analogous function) to the polyoxymethylene occurs during extrusion of the polymer and a thorough homogenization is usually reached with machines (extruders) which develop a remarkable cutting action on the macromolecular chains of the polyoxymethylene.

This action, as a result, brings forth scission phenomena of the polymer chain and "unzippering" of the two chains resulting from the scission, with consequent sharp decrease of the molecular weight and loss of useful products.

All these drawbacks are eliminated or at least greatly reduced by the process of the present invention, according to which the formaldehyde polymerization is performed in the presence of a catalyst which, at the end of polymerization remains firmly linked to the macromolecular chains of the polyoxymethylene and has a function similar to that of the stabilizers of the prior art, capable of blocking the degradation products of the polyoxymethylene.

The invention provides a process for the preparation and the simultaneous stabilization of polyoxymethylene, characterized by feeding anhydrous monomeric formaldehyde into a reaction medium comprising an organic diluent which is liquid under the reaction conditions, non solvent for the polyoxymethylene and inert (non-reactive) towards the other constituents of the reaction medium, and comprising a catalyst - stabilizer dispersed in said liquid reaction medium, consisting of a polymer A carrying a terminal ionic couple on its macromolecular chain, said polymer being a polylactamic block consisting of recurring units:

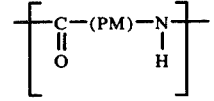

obtainable from one or more lactam monomers of the general formula:

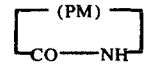

wherein PM is a linear polymethylene chain having from 3 to 13 carbon atoms, non substituted or having at least one hydrogen atom replaced by an alkyl, aryl, alkylaryl or cycloalkyl radical, said catalyst-stabilizer being present in an amount of from 0.1 to 5 parts, and preferably from 0.2 to 0.6 parts by weight for each 100 parts by weight of polyoxymethylene.

Besides, said polymer A has preferably a molecular weight of from 1,000 to 50,000.

As known in the art, polymerization of lactam monomers in the presence of an anionic catalyst leads, at the end of the polymerization reaction, to a polymer which has a terminal ionic couple on the macromolecular chain.

In this regard, reference is made to MAKROMOLEKULARE CHEMIE 155 (1968) p.33–42; 127 (1969) p.34–53; 89 (1965) p.27–43; to FORTSCHRITTE DER HOCHPOLYMEREN-FORSCHUNG 2 (1961) p.578–595; and to IUPAC 1972 (Helsinki) — Proprint 1, p.227–232.

This ionic couple originates the polymerization of formaldehyde with the production of a high molecular weight polyoxymethylene, according to a trend typical of the living polymers.

Whatever the reaction mechanism may be, by carrying out the operation according to the process of the present invention, the following advantages are attained:

— high velocities of polymerization of formaldehyde, with practically quantitative yields with respect to the formaldehyde fed and with production of a polyoxymethylene in which the ratio of the average ponderable molecular weight to the numerical one is lower than 2;

— possibility of performing the polymerization with a high concentration of polyoxymethylene and in particular with a polyoxymethylene/diluent weight ratio up to 1:1, eventhough obtaining always a suspension sufficiently fluid from which the formaldehyde polymer is easily separated in the form of a powder of high apparent density, generally of the order of 0.6–0.8 g/ml;

— handling of the polymerization which avoids in a practically complete way the polyoxymethylene scales on the polymerization apparatus;

— attainment of a polyoxymethylene containing the stabilizer capable of blocking the degradation products evolved from the polymer during the subsequent processing in the molten state and in particular during the molding;

— perfect homogenization, at molecular level, between the stabilizer and the polyoxymethylene, which allows, conclusively, the use of small amounts of stabilizer;

— characteristics of non-extractability of the stabilizer because it is linked to the macromolecular chains of the polyoxymethylene.

PREPARATION OF THE CATALYST-STABILIZER

The catalyst-stabilizer of the present invention consists of the polymer A, as previously defined and is prepared by catalytic polymerization of one or more lactam monomers, chosen among those previously defined.

Among them are preferred: ε-caprolactam, α-pyrrolidone, ω-lauryllactam, α-piperidone and ω-enantiolactam.

The polymerization occurs in the presence of an anionic catalyst consisting of a lactam derivative. In particular said catalyst consists of a lactam derivative having the following structure

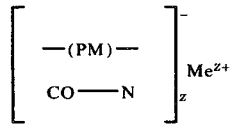

wherein Me is an alkali or alkaline earth metal or a quaternary ammonium group, z is 1 or 2 and PM is the previously defined polyoxymethylene chain.

Among the alkali metals, lithium, sodium and potassium are preferred, while among the alkaline-earth metals calcium is preferred. In the case of quaternary ammonium group the hydrogen atoms are substituted by alkyl-, cycloalkyl-, aryl- or alkylaryl groups.

Preformed catalyst, that is in the form of the lactam derivative, may be added into the polymerization medium.

For practical reasons it is preferred to introduce in the said medium containing the lactam the alkali- or the alkaline-earth metal or an organo-metallic derivative thereof or its hydride, alkoxide, phenoxide or its hydroxide and to form the derivative of the lactam in the polymerization medium.

Preferably the anionic preparation of the polymer A may be performed also, in the presence of an activator, besides of the mentioned catalyst. The presence of these substances, called also co-catalysts or promoters, renders it possible to maintain milder polymerization conditions with reduction or elimination of secondary reactions, to decrease the initial induction time and to obtain polymers with a more controlled molecular weight.

Examples of these substances are: the acyl-lactams such as the acetyls, the organic acid chlorides, the N-substituted imides or the organic acids esters such as ethyl acetate, the isocyanates such as phenyl-isocyanate etc.

The preparation of the polymer A is preferably carried out in an anhydrous atmosphere and in absence of oxygen, at a temperature which may vary within a wide range and generally from −30° to +300° C.

The best suited temperature should be selected in the range of values defined above, depending upon the type of monomers and of the desired composition of the finished polymer.

Accordingly, the polymerization time may vary from 1 minute to 120 hours.

In any event, an amount of catalyst ranging from 0.1 to 10 moles for each 100 moles of the monomer charge and eventually an amount of activator varying from 0.05 to 10 moles for 100 moles of monomer is used.

The polymerization of the lactam may be performed in suspension, in solution or in the absence of solvents or diluents.

The polymer A thus obtained is separated from the reaction medium and may be used as such for the preparation and the stabilization of the polyoxymethylene.

However, in the preferred embodiment, the raw polymer A is submitted to treatments capable of:

— separating in a particularly pure form the polymer A containing the catalytically active centers in its macromolecular chain, — setting the polymer A in a particulate form suitable for the subsequent formaldehyde polymerization.

In particular, the polymer A obtained according to the techniques previously described is purified for the purpose of separating the unreacted monomer or monomers, the free catalytic residues (that is not chemically bonded to the macromolecular chain) and other eventual impurities.

The purification may be performed by dissolution of the polymer A in a solvent, followed by precipitation and washing of the polymer.

Solvents suitable for this treatment are those in which the impurities are highly soluble and that do not destroy the catalytically active centers bonded to the macromolecular chain.

In particular the solvents belong to the following general classes: chlorinated aliphatic hydrocarbons, chlorinated aromatic hydrocarbons, aromatic nitroderivatives, substituted amides, sulfoxides, alkylphosphoramides and others.

Examples of such solvents are: nitrobenzene, chlorobenzene, dimethylformamide, dimethyl sulfoxide, and hexamethylphosphoric triamide.

According to an embodiment, the raw polymer A is dissolved in the solvent at a temperature ranging from 20° to 200° C. Then precipitation of the polymer A is induced by cooling of the solution and/or by addition of a non-solvent for the polymer. Non-solvents particularly suitable for this purpose are the aliphatic hydrocarbons, such as hexane, heptane, octane and the aromatic hydrocarbons such as benzene, toluene, xylene and others. Then the polymer A is filtered and washed with the solvent described above, until the filtrate is free from impurities. The last operations may be performed at room temperature or even at a higher temperature.

The polymer A thus obtained is utilized for preparing and simultaneously stabilizing the polyoxymethylene, carrying out the operation with the polymer A dispersed in a diluent, and therefore it is advantageous to bring said polymer to a finely subdivided particulate form for the purpose of facilitating the contact of its active centers with the formaldehyde.

For this reason, at the stage of the above-discussed purification treatment where the polymer A forms a precipitate, the conditions are generally so adjusted that the size of the particles of the precipitate ranges from 1 to 300 microns, and preferably from 1 to 100 microns.

The treatment under discussion may offer some particular aspects according as the polymer A originates from a polymerization in solution, in suspensions or in the absence of solvent or dilutents.

Thus, for example, in the case of a bulk polymerization or a polymerization in a molten state, the polymer A is conveniently pulverized and dissolved in a suitable solvent, or it is directly dissolved in the molten state. Then the precipitation and the washing of the polymer A are carried out. Said dissolution and precipitation operations may be repeated several times.

The polymer A obtained by the solution polymerization is normally precipitated by cooling and/or by addition of a non-solvent for the copolymer. Filtration and washing then follow.

It will be obvious from the above discussion that it is preferable to polymerize by the solution or the suspension technique, because the impurities remain solubilized, at least in part, in the solvent or in the diluent. In this case, this dispenses then from dissolving the polymer A in the aforesaid solvent in which the impurities are soluble and even from precipitating it, in the case of a suspension polymerization.

In this case also, the suspension technique is generally preferable, because the polymer A is then obtained in the form of finely subdivided particles (granulometry ranging from 1 to 300 microns) particularly suitable for the polymerization of the formaldehyde.

PREPARATION OF THE POLYOXYMETHYLENE

As previously stated, the stabilized polyoxymethylene is prepared by feeding gaseous and anhydrous formaldehyde in a reaction medium containing an organic diluent, which is liquid under the operation conditions, non-solvent for the polyoxymethylene and inert (non-reactive) with respect to the other constituents of the reaction medium, said medium containing the polymer A in a dispersed form.

The diluents useful for this purpose are of various natures, such as, for example, ethers (diethyl ether and dimethyl ether), hydrocarbons (pentane, hexane, heptane, decane, cyclohexane, decahydronaphthalene, xylene, benzene and toluene), and chlorinated hydrocarbons (methylene chloride).

The preferred diluents are hydrocarbons, in particular those with 5–10 carbon atoms per molecule.

The formaldehyde used should preferably be endowed with high characteristics of purity and dryness. A formaldehyde with these characteristics may be obtained by the purification methods disclosed by the U.S. Pat. Nos. 3,118,747 and 3,184,900.

The polymerization temperature may vary within large limits, that is from −70° C up to the boiling temperature of the organic diluent used as a reaction medium, in any case not exceeding 110° C, while the pressure is generally the atmospheric pressure, eventhough it is possible to operate at a higher or lower pressure. The best results are obtained by operating at a temperature of from −30° to 70° C.

The polymerization medium may include a regulator of the molecular weight such as, for example, water, formic acid and methanol, whose level may be varied during the purification stage of the monomer, or a carboxylic acid, an aliphatic alcohol having at least two carbon atoms, a cycloaliphatic or aromatic alcohol, an anhydride of a carboxylic acid, an amide, an imide, an imine or others in a proportion of the order of from 0.000001 up to 1.0% in moles on the polymerized formaldehyde.

The polymerization may be performed in a discontinous-, a semi-continous- or a continous way.

When the operation is performed in a continous way, it is possible to use a technique such as that disclosed, for instance, by U.S. Pat. No. 3,458,479.

The polyoxymethylene suspension discharged from the polymerization zone is submitted to filtration and the polymer is separated in the form of granules ranging from 50 to 700 microns, in any event according to the granulometry of the polymer A used.

The dried polyoxymethylene as in the form of a powder with an apparent density within the previously mentioned range of values.

The polyoxymethylene thus obtained contains at least one terminal hydroxyl group for each macromolecular chain, a fact which renders the product thermically unstable.

For the purpose of avoiding a depolymerization from the extremity of the chain, the hydroxyl groups are substituted with ester or ether groups, for example by treatment with acetic anhydride or, respectively, with methyl or ethyl orthoformate, or with urethan groups by treatment with an isocyanate.

For these treatments the process known in the art may be used.

Finally antioxidants such as substituted phenols or substituted bisphenols, are added to the polyoxymethylene thus treated, the resulting composition being suitable for the processing into molded articles or products by injection molding, extrusion or by the techniques known as "roto-molding" and "blow-molding".

It should be noted that the best results are obtained with a stabilized polyoxymethylene containing the polymer A in a proportion of from 0.2 to 0.6% by weight with respect to the polyoxymethylene.

In the following Examples the parts and the percentages are intended by weight, unless otherwise specified.

EXAMPLE 1

0.21 parts of metallic lithium are added to 113 parts of pure ε-caprolactam maintained under stirring in an atmosphere rigorously inert at the temperature of 110° C.

At the end of the reaction of formation of the metal-lactam, 100 parts of pure and anhydrous dimethyl sulfoxide and 4.37 parts of acetyl-caprolactam are added. The temperature of reaction is brought to 155°–160° C for a period of 4 hours.

The solution which gradually became more viscous is cooled, and at the same time 400 parts of toluene are added.

The polymer A precipitates in the form of a fine powder. The suspension is washed thoroughly with perfectly anhydrous toluene in order to remove completely the reaction solvent and the other soluble substances present.

The analysis of the polymer A shows the following results:

| | |
|---|---|
| Conversion percentage of the monomers | 88.5% |
| Reduced viscosity (liters.g$^{-1}$) | 0.86 |

(In the Examples, the A polymer viscosity is always measured at 35° C from a m-cresol solution containing 0.5 wt.% of polymer and expressed as the ratio $\eta$ reduced = $\eta$ specific/concentration in liters.g$^{-1}$)

GRANULOMETRY:

| Granulometry: | |
|---|---|
| >125 microns | 2.6% |
| 125–88 microns | 30.6% |
| 88–44 microns | 40.8% |
| <44 microns | 26.0% |

The toluene suspension of the polymer A is now ready for the subsequent polymerization stage of the formaldehyde.

Gaseous pure monomer formaldehyde is introduced at a rate of 2.5 parts per minute in a polymerization reactor containing 1000 parts of anhydrous toluene and supplied with a vigorous stirrer.

Strictly controlled conditions of absence of humidity and of air are afforded to the system by a proper device delivering a nitrogen flow. The reactor is supplied with a thermostatic jacket and the internal temperature is maintained at 35° C by water circulation.

1.0 parts of the polymer A and 0.28 parts of anhydrous ethanol are introduced into the reactor.

The feeding of monomer formaldehyde is continued for 190 minutes and then the flow is switched.

The slurry of polyoxymethylene formed is maintained for 10 minutes longer under stirring and then is filtered.

The cake is dried in a vacuum oven at 60° C, thus recovering 450.5 parts of polyoxymethylene with a yield of 94.7% with respect to the feed in formaldehyde.

The polymer has an intrinsic viscosity equal to 1.17 liters.g$^{-1}$. In the Examples, the polyoxymethylene viscosity is always measured at 60° C from a solution of p-chlorophenol with 2 wt.% of α-pinene containing 0.5 wt.% of polyoxymethylene, and expressed as the ratio $\eta$ intrinsic = $\eta$ relative/concentration in liters.g$^{-1}$.

The powder has an apparent density equal to 0.70 g/ml and the following granulometric distribution: >350 microns: 7.4%; 350–250 microns: 23,3%; 250–125 microns: 34,4%; 125–88 microns: 28.5%; <88 microns: 6.4%

One part of the polyoxymethylene is esterified with a reactive system consisting of 1.5 parts of pure acetic anhydride and 3.0 parts of a mixture of $C_{10}$–$C_{14}$ n-paraffins at a temperature of 150°–155° C for a period of 20 minutes, the pressure in the reactor being such as to maintain the system at boiling point.

At the end of the operation the suspension is cooled, filtered and the acetylated polyoxymethylene is thoroughly washed with toluene and then with acetone.

The drying is performed in a vacuum oven at 60° C with a 94.8% recovery of the product.

The acetylated polyoxymethylene does not show any variation in intrinsic viscosity and in apparent density with respect to the non-acetylated polyoxymethylene.

The acetylated polyoxymethylene containing 0.23% of polymer A is melted, extruded and transformed into 2×2 mm granules by a screw extruder with an automatic cutting blade, operating at a temperature of 180°–220° C.

The following tests are run on the granules:
— Thermal degradation test at 220° C in a nitrogen atmosphere ($K_{220}$): rate of decomposition in percent by weight of the polymer per minute during the first 30 minutes.
— Thermal degradation test at 220° C in air ($D_{220}$): weight loss in percent of the polymer after 10 and 20 minutes of heating.

The determinations are performed by a thermo-balance, the gaseous products of degradation being continuously drained away by a gas flow (nitrogen or air). The results (POM-1) are summarized in Table 1.

Correspondingly the same tests are performed on an (acetylated) sample of the same polyoxymethylene additivated with 0.35% of pentaerythrityl-tetra-beta(4-hydroxy-3,5-di-tert-butyl-phenyl) propionate and transformed into granules with the same specifications. The results of these tests (POM-2) are reported in Table 1.

Table 1

| | Color | $K_{220}$ | $D_{220}$ | |
|---|---|---|---|---|
| | | | 10' | 20' |
| POM-1 | white | 0.035 | 6.6 | 22.6 |
| POM-2 | white | 0.035 | 0.4 | 0.9 |

EXAMPLE 2

0.14 parts of metallic lithium are added to 113 parts of pure ε-caprolactam maintained under stirring at the temperature of 110° C in an inert atmosphere. After 10 minutes the reaction of formation of the metal-lactam is practically completed. Then, 150 parts of pure and anhydrous xylene and 2.4 parts of isoamyl acetate are added. The reaction system is heated at the boiling point for 6.5 hours, withdrawing 85 parts of distillate. At the end of the operation the suspension of the polymer A thus formed is cooled and thoroughly washed with xylene so as to remove any soluble residue.

The analysis of a sample of the polymer A shows the following results:

| | |
|---|---|
| Conversion | 88.8% |
| reduced viscosity | 0.65 |
| Granulometry | |
| >125 microns = | 0.6% |
| 125–88 microns = | 22.9% |
| 88–44 microns = | 50.6% |
| <44 microns = | 25.9% |

By operating in a manner analogous to that described in Example 1, a flow of pure gaseous monomer formaldehyde is introduced at the rate of 2.5 parts per minute for a period of 204 minutes into a polymerization reactor containing 1000 parts of n-heptane and 2.0 parts of the polymer A prepared as indicated above. Also, 0.25 parts of anhydrous methanol are introduced into the reactor. The temperature of polymerization is maintained at about 0° C by circulation of brine in the jacket.

At the end of the operation the flow of formaldehyde is switched and the slurry of the polyoxymethylene formed is maintained for 10 minutes longer under stirring and then is filtered.

The solid is dried in a vacuum oven at 60° C, thus recovering 487 parts of polyoxymethylene with a yield of 95.5% with respect to the feed in formaldehyde.

One part of the polyoxymethylene is stabilized by etherification in a reactive system consisting of 0.4 parts of triethylorthoformate, 0.8 parts of anhydrous dimethylformamide, 2 parts of n-dodecane and 0.005 parts of ethyl sulfate. The reaction mixture is maintained at the temperature of 150°–152° C for a period of 10 minutes.

At the end of the operation the suspension is cooled and the etherified polyoxymethylene is filtered, washed with toluene containing 1% of triethanolamine and subsequently with methanol.

After drying the etherified polyoxymethylene is recovered with a yield of 98.9%.

Various types of determinations and tests are run on the etherified polyoxymethylene.

| | |
|---|---|
| Intrinsic viscosity | = 1.40 |
| Apparent density | = 0.74 g/ml |
| Alkali stable fraction (FAS) | = 97.8% |

The sample is dissolved in benzyl alcohol with 1% of triethanolamine at the temperature of 150°–152° C for a period of 30 minutes. The etherified polyoxymethylene/alcohol ratio is maintained at 1:10. At the end of the operation the etherified polyoxymethylene precipitates by cooling and after filtration is washed with methanol and dried. The remaining percent of etherified polyoxymethylene is indicated as alkali-stable fraction (FAS).

The etherified polyoxymethylene is fractionated in a steel column filled with Celite (R.T.M.) using dimethylformamide as solvent, carrying out the operation at a programmed temperature. The analyses of the different fractions indicate that the etherified polyoxymethylene has a polydispersivity ratio (Mw/Mn) equal to 1.68.

The etherified polyoxymethylene, containing 0.41 parts of polymer A is melted and transformed into granules and submitted to the thermal degradation tests as described in Example 1. The data are reported (POM-3) in Table 2.

Correspondingly the same tests are run on a sample of the same etherified polyoxymethylene in powder additivated with 0.45% of 4-4'-thiobis(6-tert-butyl-metacresol). The mixture, after careful homogenization is transformed into granules and submitted to the thermal degradation tests in a way analogous to that of Example 1. The relative data (POM-4) are reported in Table 2.

Table 2

| | Color | $K_{220}$ | $D_{220}$ | |
|---|---|---|---|---|
| | | | 10' | 20' |
| POM-3 | white | 0.02 | 4.3 | 10.1 |
| POM-4 | white | 0.02 | 0.4 | 0.8 |

EXAMPLE 3

0.23 parts of metallic sodium are added to 113 parts of ε-caprolactam under stirring, at 100° C and in strictly inert conditions. Then 100 parts of pure anhydrous dimethylsulfoxide, 40 parts of α-pyrrolidone and 4.6 parts of N,N-diphenylcarbamoylcaprolactam are added. The mixture is reacted at the temperature of 165° C for 6 hours then is cooled and cumene is added so as to induce the precipitation of the polymer A as a fine powder. This is washed thoroughly with cumene in order to remove the reaction solvent. The analysis of a sample of the polymer A shows the following results:

| | |
|---|---|
| Conversion | 76.5% |
| Reduced viscosity | 0.88 |
| α-pyrrolidone | 11.3% |
| Melting point | 209–212° C |
| Granulometry | |
| >125 microns = | 6.7% |
| 125–88 microns = | 38.8% |
| <88 microns = | 54.5% |

By operating in a manner analogous to that described in Example 1, a flow of gaseous pure monomer formaldehyde is introduced at the rate of 2.5 parts per minute, for a period of 164 minutes into a polymerization reactor containing 1000 parts of cyclohexane and 1.8 parts of polymer A prepared as previously indicated. Also, 0.21 parts of acetic acid are introduced into the reactor. The temperature of polymerization is maintained at about 30° C by water circulation in the jacket.

At the end of the operation the flow of monomer is switched and after 10 minutes longer of stirring the polyoxymethylene slurry is filtered and dried in a vacuum oven at 60° C. 390 parts of polyoxymethylene are recovered in a yield equal to 95.0% with respect to the feed in formaldehyde.

The polyoxymethylene has an intrinsic viscosity equal to 1.5. The powder has an apparent density equal to 0.68 g/ml and the following granulometric distribution:

| | |
|---|---|
| >350 microns = | 5.2% |
| 350 – 250 microns = | 23.8% |
| 250 – 125 microns = | 33.6% |
| 125 – 88 microns = | 23.0% |
| <88 microns = | 14.4% |

The polymer prepared contains 0.46% of the polymer A. One part of this polyoxymethylene is acetylated in a manner analogous to that indicated in Example 1 with a yield of 96.5%. The analysis shows that there is no appreciable variation of viscosity and granulometry. The acetylated polyoxymethylene is melted and transformed into granules in a way analogous to that described in Example 1 and submitted to the same thermal degradation tests.

The results (POM-5) are reported in Table 3.

In a further test the acetylated polyoxymethylene in powder is additivated with 0.45% of n-octadecyl-beta(4-hydroxy-3,5-di-tert-butyl-phenyl) propionate.

The mixture after careful homogenization is transformed into granules in a manner analogous to that described in Example 1. The granules are submitted to the thermal degradation tests. The relative data (POM-6) are summarized in Table 3.

EXAMPLE 4 (COMPARISON)

The polymerization of formaldehyde is performed by operating in a way analogous to that described in Example 3, using as a catalyst tributylamine (0.012%) and as a regulator acetic acid (0.035%) in cyclohexane as a reaction medium.

83 parts of polyoxymethylene for each 100 parts of formaldehyde introduced into the reactor are obtained.

The polymer has an intrinsic viscosity equal to 1.53. The powder has an apparent density of 0.26 and the following granulometric distribution:

```
>125   microns =  0.6%
125-88 microns =  6.6%
88-44  microns = 19.4%
<44    microns = 73.4%
```

The polymer is acetylated in a manner analogous to that indicated in Example 1 with a yield equal to 90.4%.

The intrinsic viscosity of the polymer is equal to 1.57.

The acetylated polyoxymethylene is melted and transformed into granules in a way analogous to that described in Example 1 and submitted to the same thermal degradation tests.

The results (POM-7) are summarized in Table 3.

4.6 parts of polyamide, obtained from the polymerization of hexamethylenediamine adipate, hexamethylenediamine sebacate and ε-caprolactam in a 4:4:3 weight ratio are added to 995.4 parts of the acetylated polyoxymethylene in powder form.

After careful homogenization the thus stabilized polymer is transformed into granules and submitted to the thermal degradation tests as described in Example 1.

The data (POM-8) are reported in Table 3.

4.6 parts of the same polyamide previously indicated and 4.5 parts of n-octadecyl-beta(4-hydroxy-3,5-di-tert-butylphenyl) propionate are added to 990.9 parts of the acetylated polyoxymethylene in powder form.

After careful homogenization the acetylated polyoxymethylene which contains 0.46% of polyamide and 0.45% of phenolic antioxidant is melted and transformed into granules as already indicated in Example 1. Thermal degradation tests are run on the granulate and the results (POM-9) are reported in Table 3.

Table 3

| Example | POM | Color | $K_{220}$ | $D_{220}$ 10' | $D_{220}$ 20' |
|---|---|---|---|---|---|
| 3 | 5 | white | 0.03 | 3.4 | 12.0 |
|   | 6 | white | 0.03 | 0.4 | 0.8 |
| 4 | 7 | white | 0.16 | 22.4 | 73.2 |
|   | 8 | white | 0.06 | 5.0 | 18.0 |
|   | 9 | white | 0.05 | 0.9 | 1.6 |

EXAMPLE 5

0.80 parts of metallic potassium are added to 197 parts of ω-lauryllactam under stirring in an inert atmosphere at 170° C and 3.10 parts of N-acetyl-caprolactam are added after 20 minutes. The mixture is brought to a temperature of 200° C and left under these conditions for 60 minutes. Afterwards 800 parts of preheated dimethylsulfoxide are added to the molten polymer cooled at 190° C. In this way the polymer A is obtained in a very dispersed form by cooling of the resulting solution.

The suspension is washed thoroughly with benzene by decantation so as to remove any soluble residue.

The analysis of a sample of polymer A shows the following results:

```
Conversion           92.8%
reduced viscosity    1.16
Granulometry
     >88   microns =  6.2%
     88-44 microns = 39.8%
     <44   microns = 54.0%
```

By operating in a way analogous to that described in Example 1, a flow of gaseous pure monomer formaldehyde is introduced at the rate of 2.5 parts per minute for a period of 320 minutes into a polymerization reactor containing 1000 parts of benzene and 2.90 parts of the polymer A previously prepared. Also, 0.2 parts of acetic acid are introduced into the reactor.

The polymerization temperature is maintained at about 20° C by water circulation in the reactor jacket. At the end of the operation the gaseous flow of the monomer is switched and the polyoxymethylene slurry formed is maintained for 10 minutes longer under stirring, then it is filtered. The residual solid is dried in a vacuum oven at 60° C, thus recovering 762 parts of polyoxymethylene in a yield equal to 95.1% with respect to the feed in formaldehyde.

The polyoxymethylene has an intrinsic viscosity equal to 1.78. The powder has an apparent density equal to 0.63 and the following granulometric distribution:

```
>350    microns =  6.0%
350-250 microns = 37.6%
250-125 microns = 33.2%
<125    microns = 23.2%
```

The polyoxymethylene thus obtained contains 0.38% of polymer A.

The polyoxymethylene is acetylated in a way analogous to that indicated in Example 1, with a yield of 96.7%. The analysis shows that there is no appreciable variation of viscosity and composition of the polymer.

The antioxidant 2,2'methylenebis(4-methyl-6-tert-butyl-phenol) is added to the acetylated polyoxymethylene in a proportion of 0.40%.

After careful homogenization the acetylated polyoxymetylene thus containing 0.38% of polylauryllactam and 0.40% of anti-oxidant is melted in a cell (thermoplastics type) of a Plasti Corder PLV 151 (Brabender).

The cell is thermostated with heating oil at 225° C and the number of revolutions of the rotors is equal to 60/min.

Two tests are performed with a stay time equal to 10 and 20 minutes. The percentage of weight loss during plastification is determined and the Melt-Index and the thermal stability are ascertained on the discharged polymer. The relative results (POM-10) are summarized in Table 4.

EXAMPLE 6 (COMPARISON)

A finely subdivided sample of polylauryllactam and 2,2'methylene-bis-(4-methyl-6-tert-butylphenol) are added in an amount of 0.38% and 0.40%, respectively, to an acetylated polyoxymethylene in powder having an intrinsic viscosity of 1.78, obtained in a manner analogous to that indicated in Example 4.

The tests and determinations indicated in Example 5 are run on the mixture after careful homogenization.

The relative results (POM-11) are reported in Table 4.

Table 4

| POM | t (a) | Δp (b) | Melt-index at 195° C (grams/10 minutes) | $K_{220}$ | $D_{220}$ 10' | 20' |
|---|---|---|---|---|---|---|
| 10 | 10' | 0.6 | 2.25 | 0.06 | 0.7 | 1.8 |
| 10 | 20' | 0.9 | 3.00 | 0.06 | 0.7 | 2.0 |
| 11 | 10' | 1.0 | 2.84 | 0.08 | 1.0 | 2.8 |
| 11 | 20' | 1.5 | 3.94 | 1.00 | 0.9 | 3.2 |

(a)plastification time in minutes;
(b)weight loss percentage during melting in the form of gaseous products.

EXAMPLE 7

A polyoxymethylene having an intrinsic viscosity equal to 1.77, containing 0.45% of polymer A (where the polymer A is the polylauryllactam prepared in the first part of Example 5) is prepared by operating in a way analogous to that described in the formaldehyde polymerization of Example 5.

The polyoxymethylene after acetylation (as in Example 1) is additivated with 0.40% of 2,2'methylenebis (4-methyl-6-tert-butylphenol).

Thus the acetylated polyoxymethylene contains 0.45% of polylauryllactam and 0.40% of antioxidant.

The tests and determinations indicated in Example 5 are performed on the mixture after careful homogenization. The results (POM-12) are reported in Table 5.

EXAMPLE 8 (COMPARISON)

A sample of polylauryllactam in finely subdivided powder and 2,2'methylenebis(4-methyl-6-tert-butyl-phenol) are added in an amount of 0.45% and 0.40%, respectively, to an acetylated polyoxymethylene in powder. The polylauryllactam and the polyoxymethylene are identical to those used in Example 6. The tests and determinations indicated in Example 5 are performed on the mixture after careful homogenization.

The results (POM-13) are summarized in Table 5.

Table 5

| POM | t (a) | Δp (b) | Melt-index at 195° C (in grams) | $K_{220}$ | $D_{220}$ 10' | 20' |
|---|---|---|---|---|---|---|
| 12 | 10' | 0.5 | 2.25 | 0.05 | 0.6 | 1.6 |
| 12 | 20' | 0.7 | 2.90 | 0.06 | 0.6 | 1.7 |
| 13 | 10' | 0.8 | 2.55 | 0.07 | 0.7 | 2.6 |
| 13 | 20' | 1.2 | 3.50 | 0.08 | 0.8 | 2.8 |

(a)plastification time in minutes;
(b)weight loss percentage during melting in the form of gaseous products.

We claim:

1. A method for the preparation and the simultaneous stabilization of polyoxymethylene, characterized by feeding anhydrous monomeric formaldehyde into a reaction medium comprising an organic diluent which is liquid under the reaction conditions, non solvent for the polyoxymethylene and inert (non-reactive) towards the other constituents of the reaction medium, and comprising a catalyst-stabilizer dispersed in said liquid reaction medium, consisting of a polymer A carrying a terminal ionic couple on its macromolecular chain, said polymer being a polylactamic block consisting of recurring units:

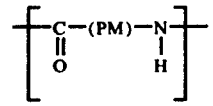

obtainable from one or more lactam monomers of the general formula:

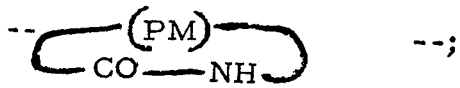

wherein PM is a linear polymethylene chain having from 3 to 13 carbon atoms, non substituted or having at least one hydrogen atom replaced by a radical selected in the group consisting of the alkyl, aryl, alkylaryl and cycloalkyl radicals, said catalyst-stabilizer being present in an amount of from 0.1 to 5 parts by weight for each 100 parts of weight of polyoxymethylene.

2. The method of claim 1, wherein said amount is of from 0.2 to 0.6 parts of weight for each 100 parts by weight of polyoxymethylene.

3. The method of claim 1, wherein said polymer A has a molecular weight of from 1000 to 50,000.

4. The method of claim 1, wherein said monomeric lactams are selected in the group consisting of ε-caprolactam, α-pyrrolidone, ω-lauryllactam, α-piperidone and ω-enantiolactam.

5. The method of claim 1, wherein said diluent is selected in the group consisting of ethers, hydrocarbons and chlorinated hydrocarbons.

6. The method of claim 1, wherein the reaction temperature is from −70° C up to the boiling temperature of the organic diluent, at any rate not exceeding 110° C.

7. The method of claim 1, wherein the reaction temperature is of from −30° to 70° C.

8. The method of claim 1, wherein said polymer A is obtained by polymerization of one or more of said lactam monomers at a temperature of from −30° to 300° C, for a period of from 1 minute to 120 hours and in the presence of a derivative of a lactam of the formula:

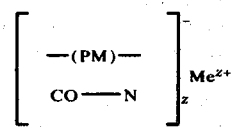

wherein Me is an alkali metal, an alkaline earth metal or a quaternary ammonium group, z is 1 or 2, and PM is the said polymethylene chain, said derivative being used in a proportion of from 0.1 to 10 moles for each 100 moles of lactam monomers.

9. The method of claim 8, wherein said polymer A is obtained by polymerization in the presence of an activator in an amount of from 0.1 to 10 moles for each 100 moles of lactam monomers.

10. The method of claim 1, wherein said dispersed polymer A is in the form of particles of from 1 to 300 microns in size.

* * * * *